(12) United States Patent
MacArthur et al.

(10) Patent No.: US 11,958,448 B2
(45) Date of Patent: Apr. 16, 2024

(54) VEHICLE LIFTING AND SPARE TIRE STORAGE SYSTEM

(71) Applicant: Toyota Motor Engineering & Manufacturing North America, Inc., Plano, TX (US)

(72) Inventors: Robert C. MacArthur, Ypsilanti, MI (US); Shigenori Shibata, Ann Arbor, MI (US); Corey Zwegers, Dexter, MI (US); Rachel M. Menchak, Saline, MI (US); Claudia A. Ma, Northville, MI (US); Adam R. VanAntwerp, Chelsea, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 434 days.

(21) Appl. No.: 17/345,715

(22) Filed: Jun. 11, 2021

(65) Prior Publication Data

US 2022/0396245 A1 Dec. 15, 2022

(51) Int. Cl.
*B62D 43/00* (2006.01)
*B60S 9/02* (2006.01)
(Continued)

(52) U.S. Cl.
CPC .............. *B60S 9/02* (2013.01); *B62D 43/00* (2013.01)

(58) Field of Classification Search
CPC ...... B60S 9/02; B60S 9/12; B60S 9/08; B60S 9/06; B60S 11/00; B60S 9/00; B60S 9/14; B60S 9/22; B60S 9/04; B60S 9/10; B60S 9/16; B60S 9/18; B60S 9/20; B60S 9/205; B62D 43/00; B62D 43/002; B62D 43/04;
(Continued)

(56) References Cited

U.S. PATENT DOCUMENTS 5,219,429 A  6/1993 Shelton
5,722,641 A  3/1998 Martin et al.
(Continued)

FOREIGN PATENT DOCUMENTS

CN  105799664 A  7/2016
KR  19980051415 U  9/1998
(Continued)

*Primary Examiner* — Adam R Mott
*Assistant Examiner* — Byron Xavier Kasper
(74) *Attorney, Agent, or Firm* — Christopher G. Darrow; Darrow Mustafa, PC

(57) ABSTRACT

A lifting system for generating a lifting force on a portion of a vehicle includes a vehicle wheel and a force-generating mechanism structured to be received inside a rim cavity of the wheel. The force-generating mechanism is also structured to be operably connected to a frame of a vehicle. A bearing member is operably connected to the force-generating mechanism. The bearing member is structured to transmit a force generated by the force-generating mechanism to a surface in physical contact with the bearing member. The bearing member is also structured for operably connecting the wheel to the force-generating mechanism. Force applied by the force-generating mechanism may be sufficient to lift a portion of the vehicle off of a ground surface, or the force may only be sufficient to apply a parking brake force without lifting the vehicle.

10 Claims, 9 Drawing Sheets

(51) Int. Cl.
*B60S 9/06* (2006.01)
*B60S 9/08* (2006.01)
*B60S 9/12* (2006.01)
*B62D 43/04* (2006.01)

(58) Field of Classification Search
CPC .... B66F 11/04; B66F 7/00; B66F 7/24; B66F 7/26; B66F 7/10; B60B 29/00; B60B 29/001; B60B 2340/70; B60C 25/0521
See application file for complete search history.

(56) References Cited

U.S. PATENT DOCUMENTS

| | | | |
|---|---|---|---|
| 5,931,500 A | 8/1999 | Dagnese | |
| 6,527,254 B1 | 3/2003 | Prevete | |
| 6,913,248 B1 | 7/2005 | Schmitz | |
| 6,991,221 B1 | 1/2006 | Rodriguez | |
| 7,025,361 B1 * | 4/2006 | Erickson | B60S 9/02 |
| | | | 280/6.154 |
| 8,424,848 B1 | 4/2013 | Hawkins, Jr. | |
| 8,919,739 B1 | 12/2014 | Romero et al. | |
| 2004/0026672 A1 * | 2/2004 | Caloger | B60S 11/00 |
| | | | 254/1 |
| 2005/0127949 A1 | 6/2005 | Ngo et al. | |
| 2006/0043352 A1 | 3/2006 | Singh et al. | |
| 2014/0217342 A1 | 8/2014 | Dondurur et al. | |
| 2016/0075311 A1 * | 3/2016 | Garceau | G01C 9/06 |
| | | | 33/328 |
| 2016/0251001 A1 | 9/2016 | King | |
| 2016/0288776 A1 * | 10/2016 | Dominguez | B60S 9/04 |
| 2018/0290634 A1 * | 10/2018 | Belley | B66F 5/04 |
| 2019/0100258 A1 * | 4/2019 | Cherry | B62D 43/02 |

FOREIGN PATENT DOCUMENTS

| | | | | |
|---|---|---|---|---|
| KR | 101509607 B1 * | 4/2015 | | B60S 9/02 |
| WO | 2001066391 A1 | 9/2001 | | |
| WO | 2003047932 A1 | 6/2003 | | |
| WO | 20060081533 A3 | 8/2006 | | |

\* cited by examiner

VEHICLE LIFTING AND SPARE TIRE STORAGE SYSTEM

TECHNICAL FIELD

The embodiments disclosed herein relate to mechanisms for exerting lifting forces on vehicles and, more particularly, to a mechanism which may be permanently mounted to a vehicle for storing a spare tire and for exerting varying degrees of lifting forces on a portion of a vehicle according to a particular application.

BACKGROUND

Vehicles usually include a spare wheel or tire which may be installed to replace a damaged wheel, and a jack structured to lift a portion of the vehicle so that the damaged wheel may be replaced. An ongoing problem is where to store the jack and spare wheel. External storage may be unsightly and insecure, while storage in the vehicle trunk may occupy valuable storage space which could be used for other items. Also, under certain conditions, it may be inconvenient and/or hazardous to attempt to use a conventional jack to lift a portion of the vehicle.

SUMMARY

In one aspect of the embodiments described herein, a lifting system for generating a lifting force on a portion of a vehicle is provided. The lifting system includes a vehicle wheel, a force-generating mechanism structured to be received inside a rim cavity of the wheel and structured to be operably connected to a frame of a vehicle, and a bearing member operably connected to the force-generating mechanism. The bearing member is structured to transmit a force generated by the force-generating mechanism to a surface in physical contact with the bearing member. The bearing member is also structured for operably connecting the wheel to the force-generating mechanism.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A lifting system for generating a lifting force on a portion of a vehicle includes a vehicle wheel and a force-generating mechanism structured to be received inside a rim cavity of the wheel. The lifting system is attachable to a frame of the vehicle underneath the vehicle, thereby helping to conserve valuable trunk or stowage space. The force-generating mechanism is also structured to be operably connected to a frame of a vehicle. A bearing member is operably connected to the force-generating mechanism. The bearing member is structured to transmit a force generated by the force-generating mechanism to a surface in physical contact with the bearing member. The bearing member is also structured for operably connecting the wheel to the force-generating mechanism. Force applied by the force-generating mechanism may be sufficient to lift a portion of the vehicle off of a ground surface, or the force may only be sufficient to apply a parking brake force without lifting the vehicle.

Figure 1:
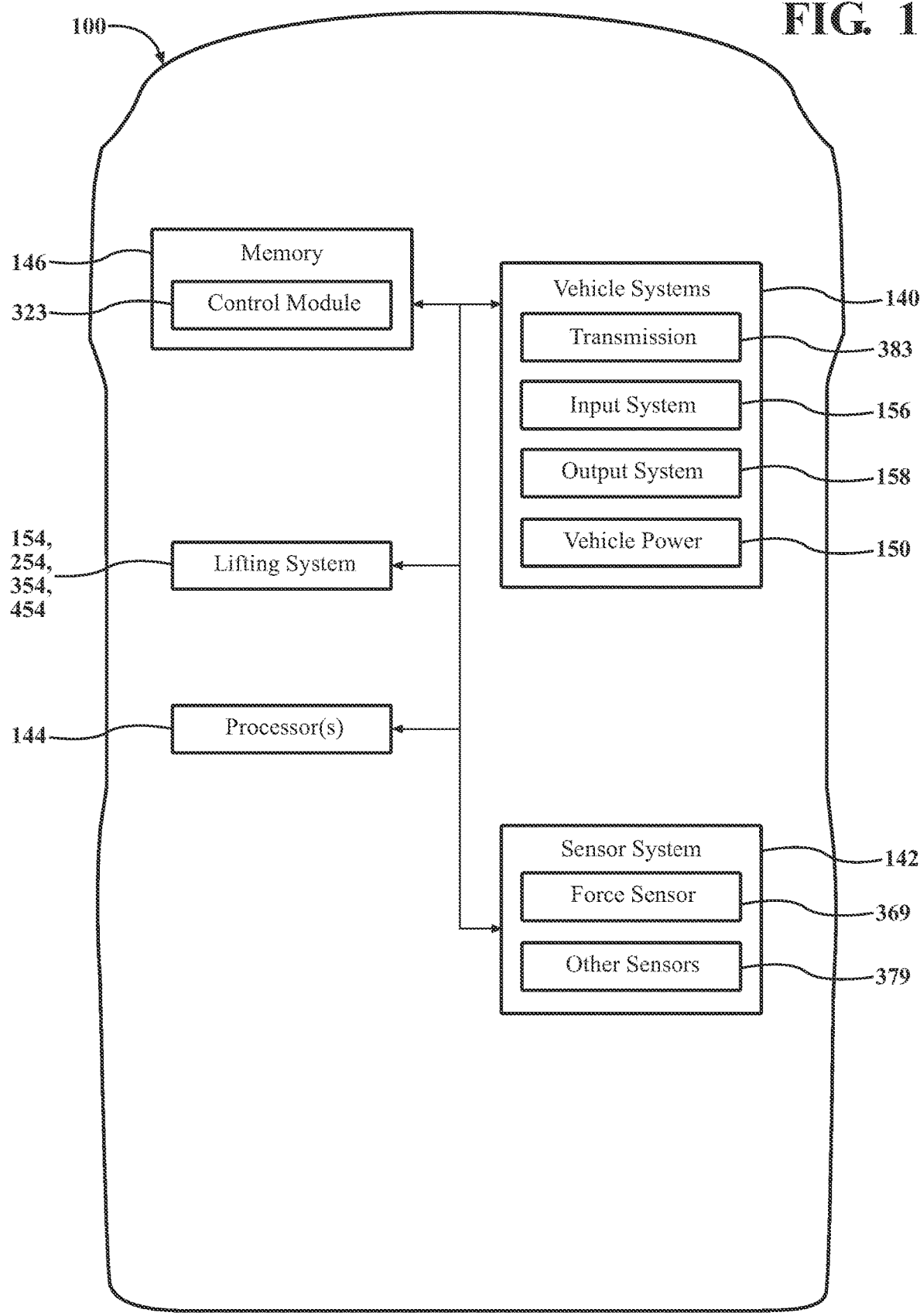
FIG. 1 is a schematic block diagram showing elements of a vehicle incorporating a lifting system in accordance with an embodiment described herein.

FIG. 1 shows an example of a vehicle 100 incorporating an embodiment of a system for generating a lifting force on a portion of the vehicle (i.e., a "lifting system") as described herein. In one or more implementations, the vehicle 100 is conventional passenger vehicle, such as a sedan or a hatchback, for example. The vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100.

The vehicle systems can include a transmission system (or "transmission") 383. The transmission 383 may be operably connected to a control module 323 (described in greater detail below) and may be configured to be controllable by the control module 323 to shift between a state allowing rotation of the wheels 109, 111, and a state in which rotation of the wheels is prevented (i.e., a "parking" state). The term "operably connected," as used throughout this description, can include direct or indirect connections, including connections without direct physical contact.

In addition, the vehicle 100 may include an engine 299 (FIG. 6) and front wheels 109 and rear wheels 111 mounted on respective vehicle axles, as well as other powertrain components housed in the engine compartment and elsewhere in the vehicle 100. The wheels 109, 111 may support the remainder of the vehicle 100 on the ground. One, some or all of the wheels 109, 111 may be powered by the remainder of the powertrain components to drive the vehicle 100 along the ground.

The vehicle 100 can include an input system 156. An "input system" includes any device, component, system, element or arrangement or groups thereof that enable information/data to be entered into a machine. For example, the input system 156 may include a keypad, a touch screen or other interactive display, a voice-recognition system and/or any other device or system which facilitates communications between a user and the vehicle. The input system 156 can include one or more buttons or switches, each button or switch being associated with a respective control command and being operable by a user. The input system 156 can receive wireless input from a vehicle occupant (e.g., a driver or a passenger) or a user located remotely from the vehicle 100. The input system may enable a user to input control commands to the lifting force system for the various purposes described herein. For example, the input system 156 may be configured to enable a user to generate control commands for lowering the vehicle wheel to a wheel removal location, for moving the bearing member into contact with the ground surface and applying a lifting force, and/or for moving the bearing member toward the ground surface and applying an increasing force to a surface (such as the vehicle wheel 201) in contact with the bearing member until a predetermined bearing force is reached.

The vehicle 100 can also include an output system 158. An "output system" includes any device, component, or arrangement or groups thereof that enable information/data to be presented to a vehicle occupant (e.g., a driver, a vehicle passenger, etc.) or a remote user. For example, the output system may be operable to issue tactile, sound and visual outputs that may be sensed by users. The output system may enable a user to receive alerts or other information relating to the position and other operating parameters of the lifting system embodiments described herein. For example, the output system may be configured to indicate to a user a status of the lifting system, such as a notification when a user-generated control command has been executed.

The vehicle 100 can also include a vehicle power system 150. The vehicle power system 150 may be configured to provide electrical and/or mechanical power from vehicle systems and/or components for powering the lifting system embodiments described herein. The vehicle power system 150 may include any vehicle systems and/or elements needed to power operation of an embodiment of the lifting system to perform the operations described herein. Such systems and/or elements may depend on the particular type of force-generating system used in the lifting system, and may include energy conversion hardware and/or software, control hardware and/or software (e.g., such as fluid control valving, conduits, electrical wiring), the vehicle engine, a vehicle battery, one or more compressors, one or more accumulators or reservoirs usable for storing pressurized liquid or gaseous working fluids, and other systems and/or components as needed. Such systems and/or elements may be in addition to elements of the lifting system itself.

The vehicle 100 can include the sensor system 142. The sensor system 142 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. The sensor system 142 is operable to detect information about the vehicle 100. In arrangements in which the sensor system 142 includes a plurality of sensors, the sensors can work independently from each other. Alternatively, two or more of the sensors can work in combination with each other. In such cases, the two or more sensors can form a sensor network. The sensor system 142 and/or the one or more sensors can be operably connected to the processor(s) 144 and/or other element(s) of the vehicle 100 (including any of the elements shown in FIG. 1).

The sensor system 142 may include one or more force sensors 369 configured to detect the magnitude of a bearing force exerted by a force-generating mechanism of a lifting system on a surface in contact with the lifting system. The magnitude of this force may be used to control certain operations of the lifting system as described herein. The sensor system 142 may also include other sensors as needed for operation of the lifting system as described herein, depending on the particular configuration of the lifting system.

FIGS. 2A-5 show various particular embodiments of the lifting system. The embodiments of the lifting system may have some elements common to all embodiments and one or more element(s) distinctive to each embodiment, as described herein. For example, each lifting system embodiment shown may incorporate a distinctive type of force-generating mechanism.

Referring to the drawings, each embodiment of the lifting system may include a vehicle wheel 201 structured to mountable on the vehicle 100 in place of one of the wheels 109, 111. In one or more arrangements, the vehicle wheel 201 may be in the form of a spare tire for the vehicle 100. The vehicle wheel 201 may include a wheel rim 201a having a rim base 201b and a continuous, generally cylindrical rim wall 201c extending from edges of the rim base 201b. In combination, the rim base 201b and the rim wall 201c may define a rim cavity 201d therebetween. The rim cavity 201d may be structured for receiving one or more elements of an associated force-generating system therein when the lifting system is in a stowed condition as described herein. A tire 203 may be mounted on the wheel rim 201a. Thus, in the embodiments described herein, the lifting system may serve as a storage mechanism for the vehicle spare tire.

In one or more arrangements, when operably connected to an associated force-generating system of the lifting system as described herein, the vehicle wheel 201 may be positioned between elements of the force-generating system and a ground surface G1 on which the vehicle resides. Also, when interposed between elements of the force-generating system and the ground surface G1, the vehicle wheel 201 may aid in protecting the elements of the force-generating mechanism from mud, dirt, slush, etc. during operation of the vehicle 100.

Referring to the drawings, in one or more arrangements, the lifting system may include a housing 210 structured for attachment to the vehicle frame 199 and structured to receive the vehicle wheel 201 therein. The housing 210 may also aid in protecting the force-generating system of the lifting system from the vehicle exterior environment. The housing 210 may include a base portion 210a and a continuous, generally cylindrical wall 210b extending from edges of the base portion to form a cavity 210c therebetween structured for receiving the vehicle wheel 201. As seen in the drawings, one or more elements of the force-generating system may also be received in the housing 210, for example, when the lifting system is in the stowed condition.

The housing may be attached to the vehicle frame using any suitable method, such as welding or bolts. The force-generating mechanism may then be operably connected to the housing. Alternatively, the force generating mechanism may be operably connected directly to the frame and the housing omitted.

In one or more arrangements, the housing 210 may be structured to minimize a clearance between the outermost edge of the tire 203 and the housing wall 210b. This may aid in preventing dirt, slush, etc. from migrating behind the vehicle wheel 201 to the force-generating system components residing inside the rim cavity 201d.

Each embodiment of the lifting system may include an associated force-generating mechanism structured to be received inside the rim cavity 201d of the wheel 201 and structured to be operably connected to the vehicle frame 199. The force-generating mechanism may be considered to be received in the rim cavity 201d when at least a portion of the force-generating mechanism resides within the rim cavity when the lifting system is in a stowed condition.

The force-generating mechanism may be structured to generate a lifting force on the vehicle 100. A "lifting force" may be a force tending to increase a distance between the portion of the vehicle and a surface on which the vehicle resides. The generated lifting force may or may not be sufficient to increase the actual physical distance between a portion of the vehicle acted on by the force and the surface on which the vehicle resides.

In one or more arrangements, the force-generating system may be operably connected to the housing 210, and a bearing member 229 (described in greater detail below) and the vehicle wheel 201 may then be operably connected to the force-generating system. In this arrangement, the housing 210, force-generating system, vehicle wheel 201 and bearing member 229 may combine to form a lifting system "module" or self-contained unit which may be attached to the vehicle frame 199 by operably connecting the housing 210 to the frame.

In applications (such as a response to the user-initiated parking brake control command described herein) where the generated lifting force does not increase the distance between a portion of the vehicle 100 and the surface G1 on which the vehicle resides, the force-generating mechanism may effectively focus a proportion of the weight of the vehicle 100 through the force-generating mechanism and the bearing member 229 onto a surface in contact with the bearing member. The lifting force may be transmitted directly to the portion of the vehicle, by direct physical contact between the portion of the vehicle and a force-generating mechanism of the lifting system. Alternatively, the lifting force may be transmitted to the portion of the vehicle indirectly, by a physical connection between the portion of the vehicle and another part of the vehicle in direct physical contact with the force-generating mechanism. In one or more arrangements, the force-generating mechanism may be structured to be positioned between the vehicle frame 199 and the ground surface G1 on which the vehicle resides. In general, the force-generating mechanism may include a first portion structured to be operably connected to the vehicle frame 199, and a second portion structured to be operably connected to the bearing member 229. The first and second portions of the force-generating mechanism may be movable relative to each other during operation of the various embodiments of the force-generating mechanism as described herein, to exert the lifting force.

FIGS. 2A-2D show one particular embodiment 154 of the lifting system including an associated particular embodiment of the force-generating system. Referring to FIGS. 2A-2D, in one or more arrangements, the force-generating mechanism may be in the form of a scissor-jack mechanism 160. The scissor-jack mechanism may include a first portion 160a structured to be operably connected to the vehicle frame 199 or to a housing 210, and a second portion 160b structured to be operably connected to the bearing member 229. Connecting spars 160c, 160d may be operably connected to the first portion 160a so as to be rotatable with respect to the first portion as the first portion moves. Connecting spars 160e, 160f may also be operably connected to the second portion 160b so as to be rotatable with respect to the second portion as the second portion moves.

As known in the pertinent art, ends of the spars 160c, 160e may be rotatably coupled to a threaded collar 160g structured to matingly engage a first set of complementary threads 231a formed along an externally-threaded shaft 231. Also, ends of the spars 160d, 160f may be rotatably coupled to another threaded collar 160h structured to matingly engage a second set of complementary threads 231b formed along the shaft 231. The first and second sets of threads 231a, 231b along the shaft 231 may be formed in opposite directions starting from a location along the body of the shaft so that rotation of the shaft in a first direction causes the collars 160g, 160h to simultaneously move toward each other, while rotation of the shaft in a second direction opposite the first direction causes the collars to simultaneously move away from each other.

Figure 2A:
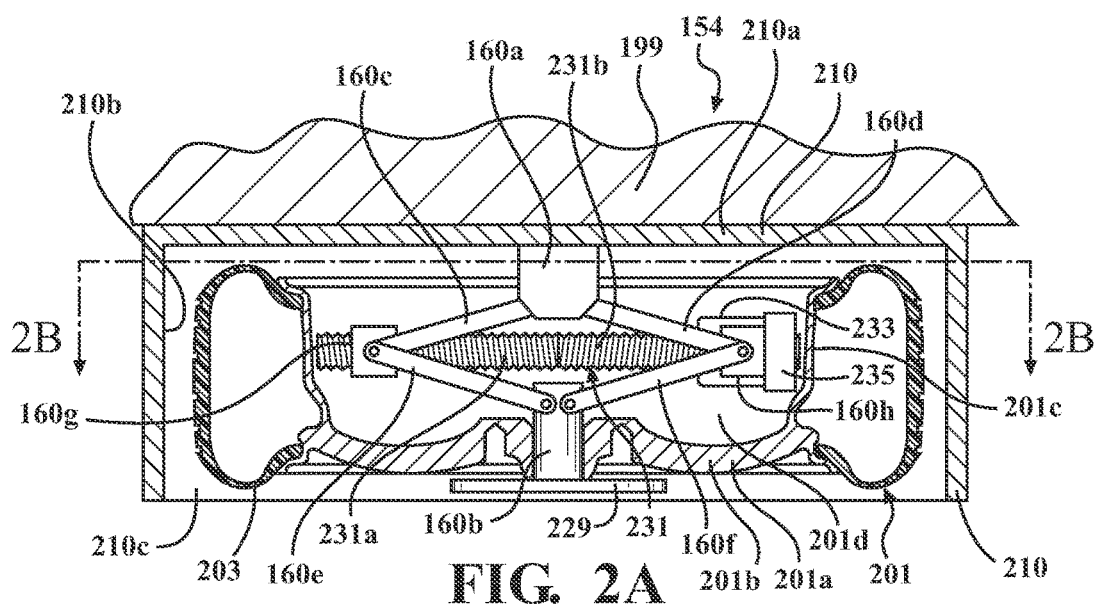
FIG. 2A is a schematic cross-sectional view of a portion of a vehicle, showing a first embodiment of a lifting system operably connected to a frame of the vehicle and in a stowed condition with a stored vehicle wheel mounted thereon.

Movement of the collars 160g, 160h toward each other along the shaft 231 causes the attached spars to rotate so as to move the scissor-jack mechanism first and second portions 160a, 160b away from each other, thereby applying a lifting force to a portion of vehicle 100 connected to the mechanism first portion 160a when the mechanism second portion 160b exerts a bearing force on the ground surface G1. Movement of the collars 160g, 160h away from each other along the shaft 231 causes the spars to rotate so as to move the scissor-jack mechanism first and second portions 160a, 160b toward each other, thereby retracting the force-generating mechanism toward the vehicle frame 199. For a stowed condition of the lifting system (FIG. 2A), the scissor-jack mechanism 160 may be retractable so as to fit inside the wheel rim cavity 201d as shown in FIG. 2A.

Figure 2B:
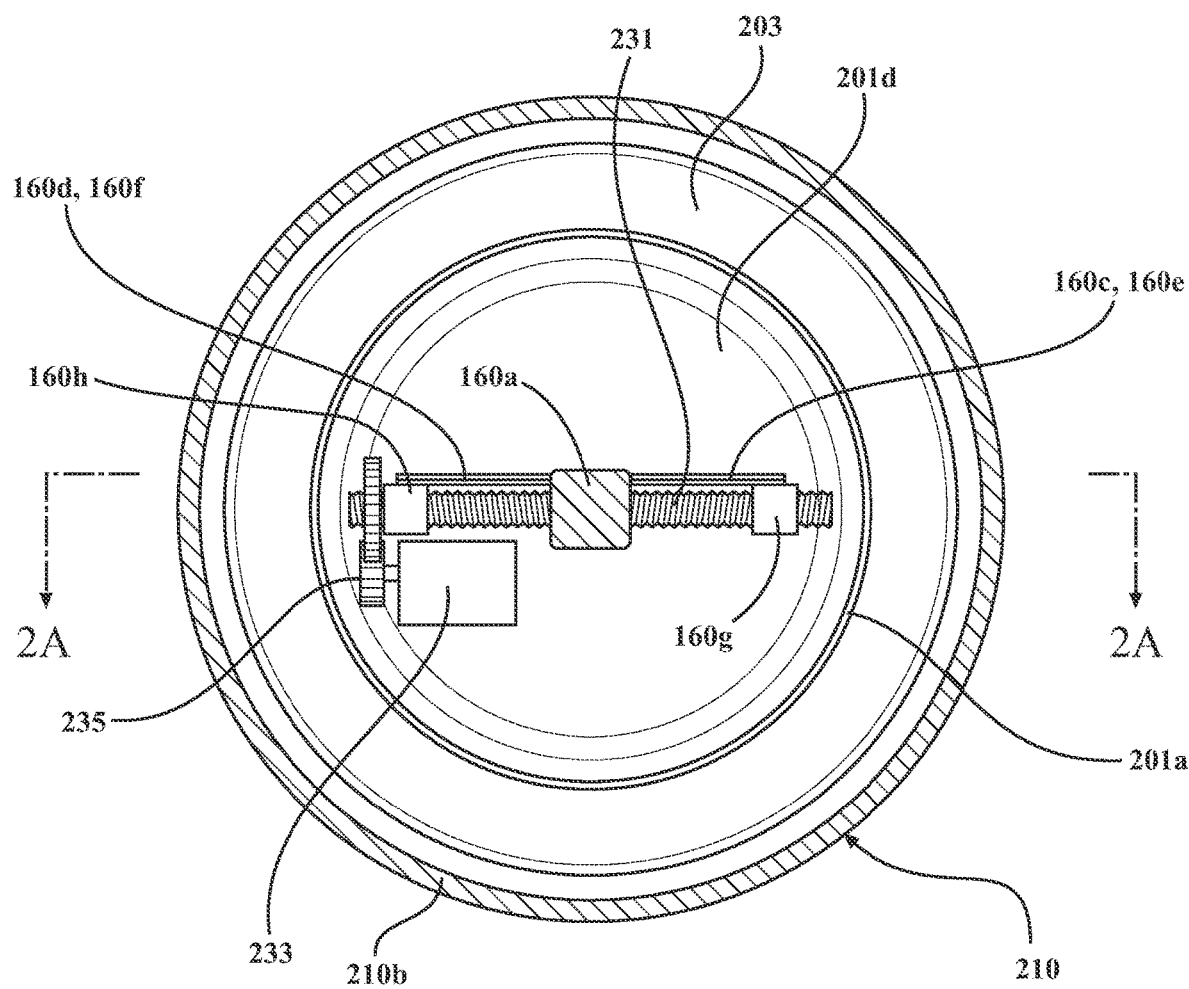
FIG. 2B is a schematic cross-sectional plan view of the lifting system embodiment shown in FIG. 2A.

As seen in FIG. 2B, the shaft 231 may be rotated by a dedicated motor 233 operably connected to the shaft 231. If needed, a suitable gear train 235 may operably connect the shaft 231 to the motor 233 for rotating the shaft. In one or more arrangements, the motor 233 and gear train 235 may be structured to be received in the rim cavity 201d as shown to provide a more compact force-generating mechanism.

Figure 2C:
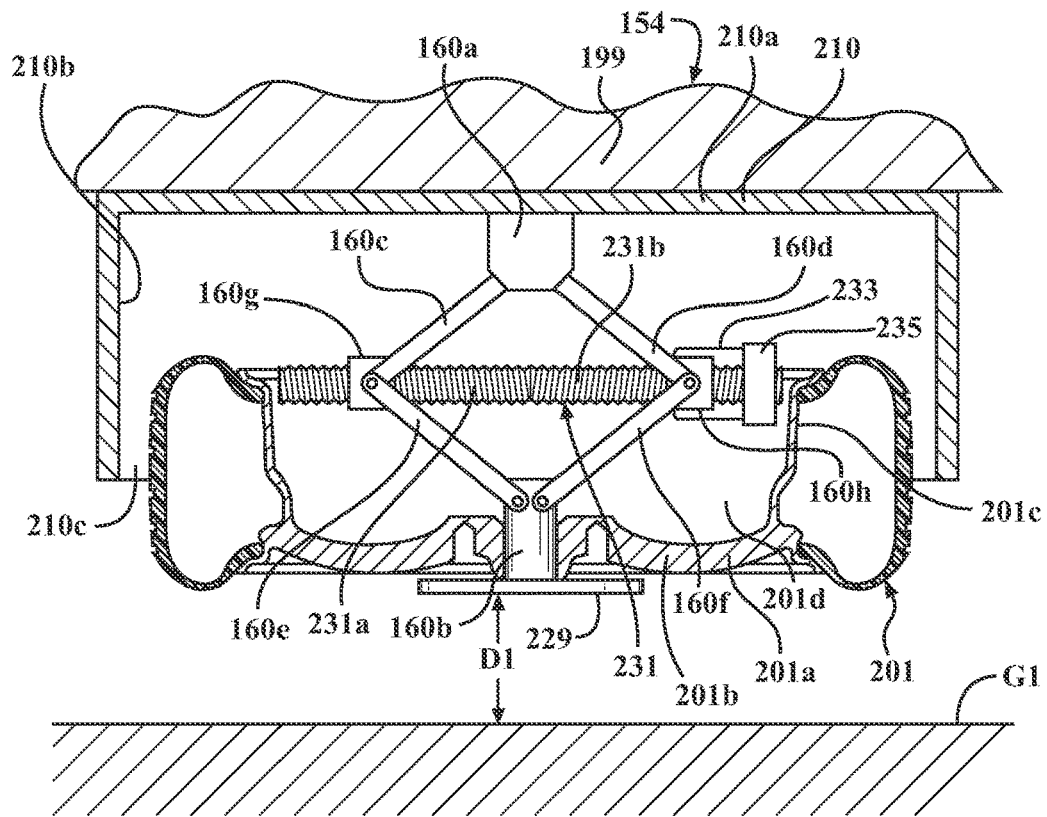
FIG. 2C is the schematic cross-sectional view of FIG. 2A, showing the first embodiment of the lifting system in a deployed condition enabling detachment of the stored vehicle wheel from the lifting system for use as a spare tire.
Figure 2D:
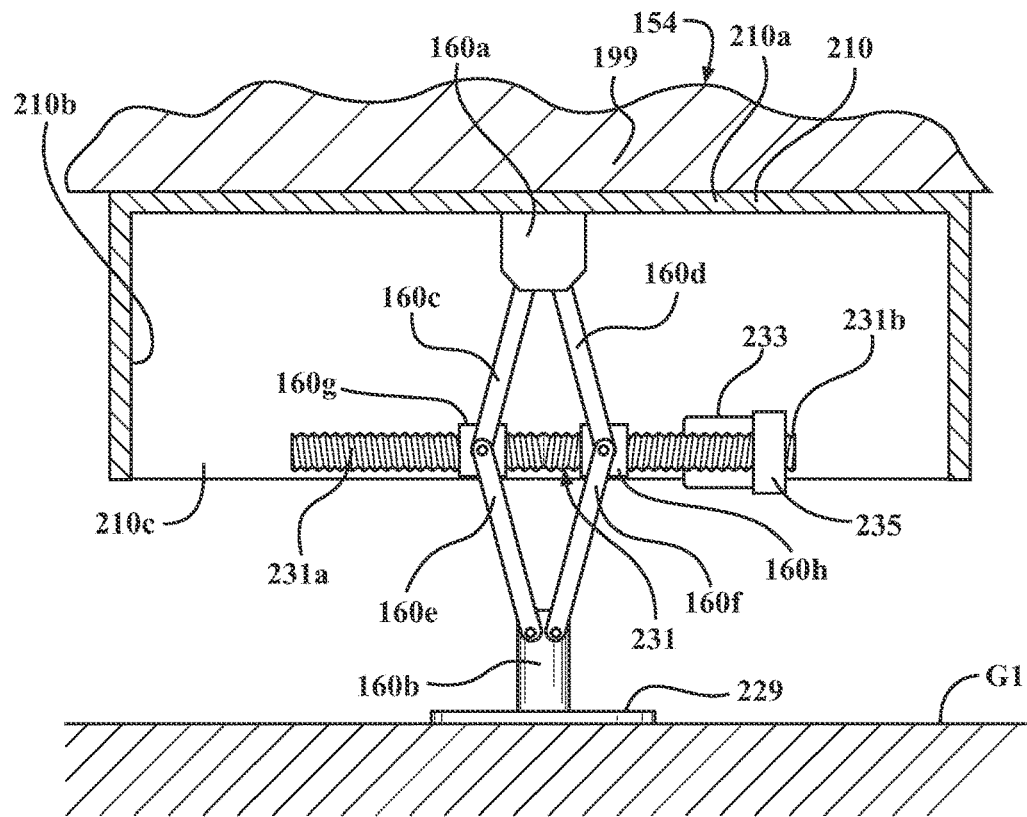
FIG. 2D is the schematic cross-sectional view of FIGS. 2A and 2C, showing the first embodiment of the lifting system after removal of the vehicle wheel and in a fully deployed condition in contact with a ground surface for exerting a lifting force on the vehicle.

As described herein, and as shown in FIG. 2C, responsive to a vehicle wheel access control command, the force-generating mechanism of the lifting system 154 may be controlled to move the vehicle wheel 201 toward the ground surface G1 to a location a predetermined distance D1 from the ground surface. This function may act to lower the vehicle wheel 201 from the housing to a vehicle wheel removal location so that a user may remove it for use as a spare tire.

Figure 3A:
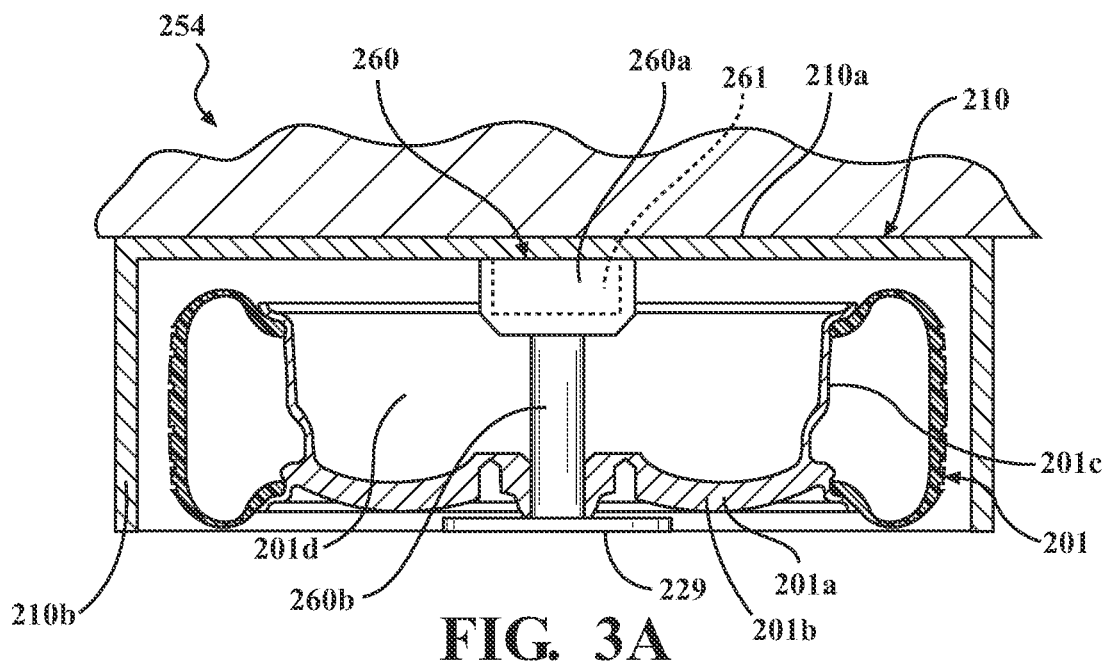
FIG. 3A is a schematic cross-sectional view of a portion of a vehicle, showing a second embodiment of the lifting system operably connected to a frame of the vehicle and in a stowed condition with a stored vehicle wheel mounted thereon.
Figure 3B:
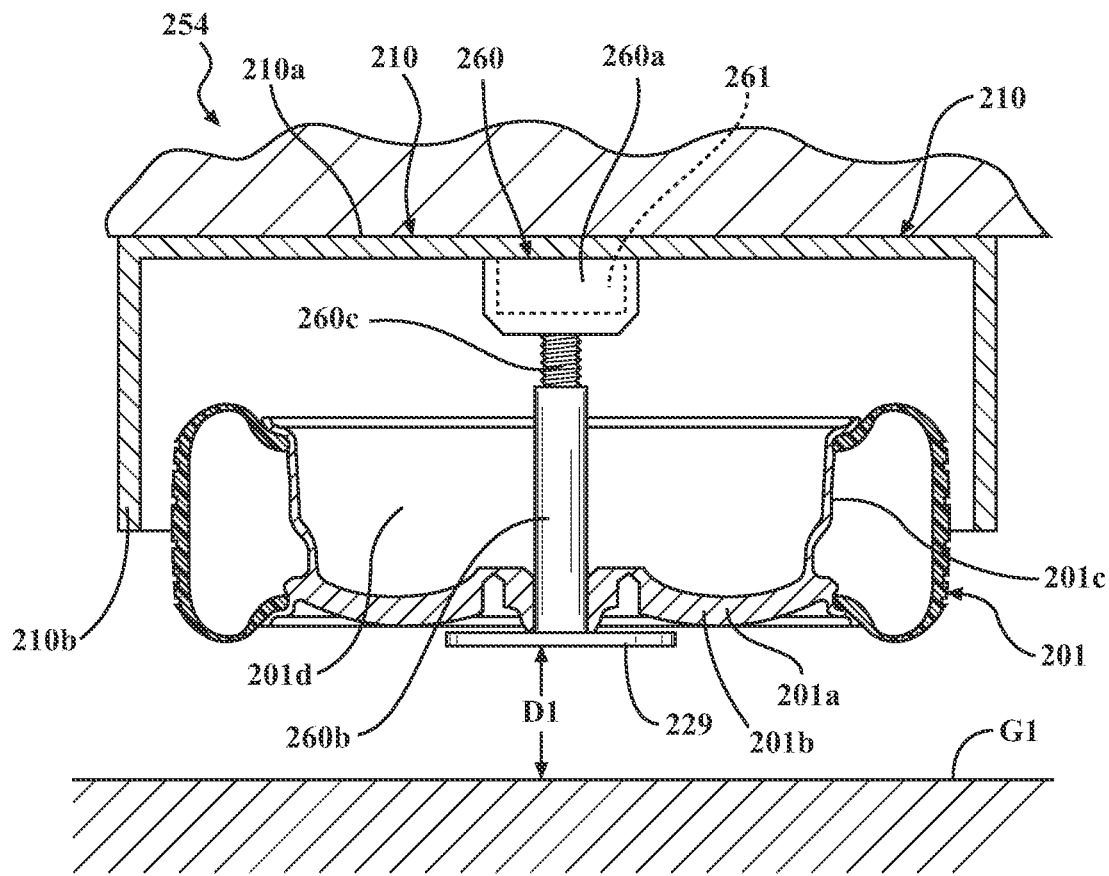
FIG. 3B is the schematic cross-sectional view of FIG. 3A, showing the second embodiment of the lifting system in a deployed condition enabling detachment of the stored vehicle wheel from the lifting system for use as a spare tire.
Figure 3C:
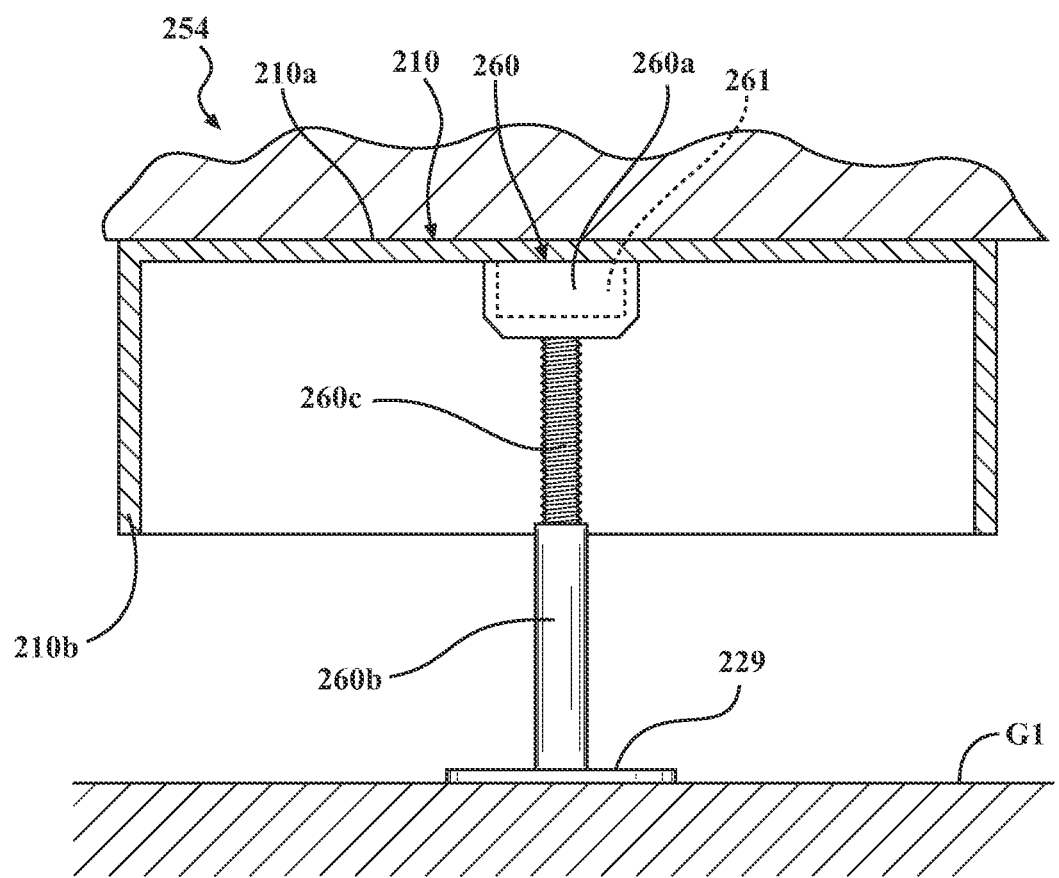
FIG. 3C is the schematic cross-sectional view of FIGS. 3A and 3B, showing the second embodiment of the lifting system after removal of the vehicle wheel and in a fully deployed condition in contact with a ground surface for exerting a lifting force on the vehicle.

FIGS. 3A-3C show another particular embodiment 254 of the lifting system including an associated particular embodiment of the force-generating system. Referring to FIGS. 3A-3C, in one or more arrangements, the force-generating system of the lifting system 254 may be in the form of a screw-type jack mechanism. The screw-type jack mechanism may include a base 260a containing a motor 261 and structured to be operably connected to the vehicle frame 199 or to housing 210. An extendible second portion 260b of the jack mechanism 260 may be structured to be operably connected to the bearing member 229. An externally-threaded power screw 260c structured to be rotatable by operation of the motor 261 may be received in second portion 260b, with external threads of the screw 260c engaging complementary internal threads formed in mechanism second portion 260b. The second portion 260b of the jack mechanism 260 may be extended away from base 260a by operating motor 261 to rotate the screw 260c so as to move the second portion 260b toward the ground surface G1. The lifting force may be applied to the vehicle 100 by controlling operation of the motor to rotate the screw 260c to extend the jack mechanism second portion 260b from the base 260a (FIGS. 3B, 3C) into contact with the ground surface. The jack mechanism second portion 260b may be retractable into the base 260a so that the screw-type jack mechanism 260 is received in the rim cavity 201d as shown in FIG. 3A. For a stowed condition of the lifting system (FIG. 3A), the screw-type jack mechanism 260 may be retractable so as to fit inside the rim cavity 201d as shown in FIG. 3A.

As described herein, and as shown in FIG. 3B, responsive to a vehicle wheel access control command, the force-generating mechanism of the lifting system 254 may be controlled to move the vehicle wheel 201 toward the ground surface G1 to a location a predetermined distance D1 from the ground surface. This function may act to lower the vehicle wheel 201 from the housing to a vehicle wheel removal location so that a user may remove it for use as a spare tire.

Figure 4A:
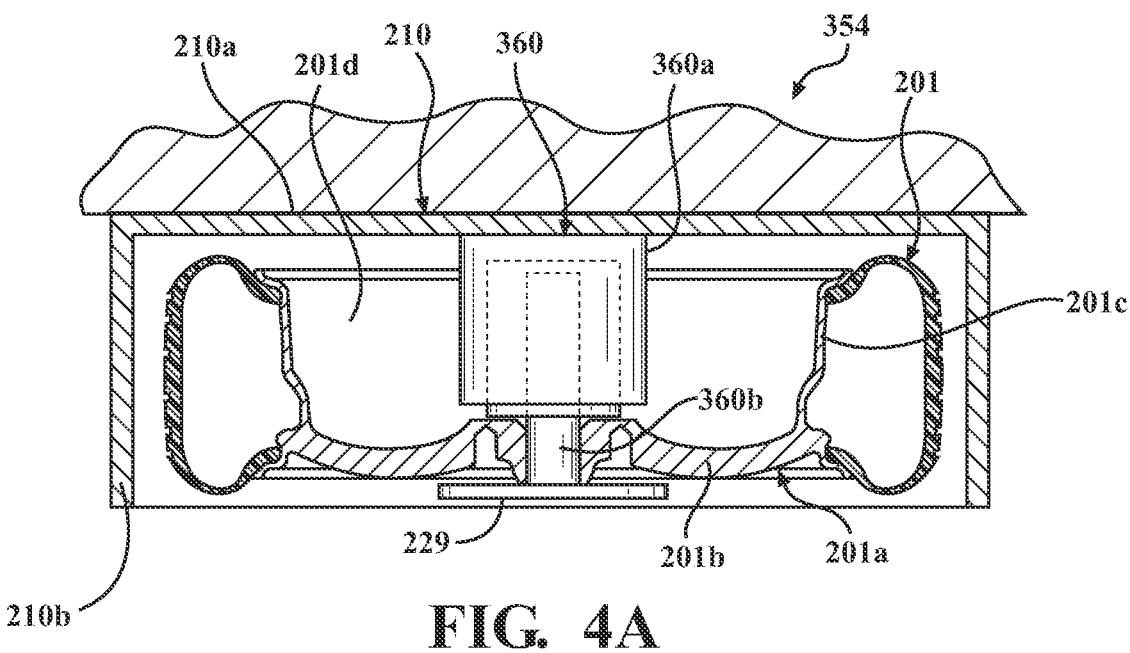
FIG. 4A is a schematic cross-sectional view of a portion of a vehicle, showing a third embodiment of the lifting system operably connected to a frame of the vehicle and in a stowed condition with a stored vehicle wheel mounted thereon.
Figure 4B:
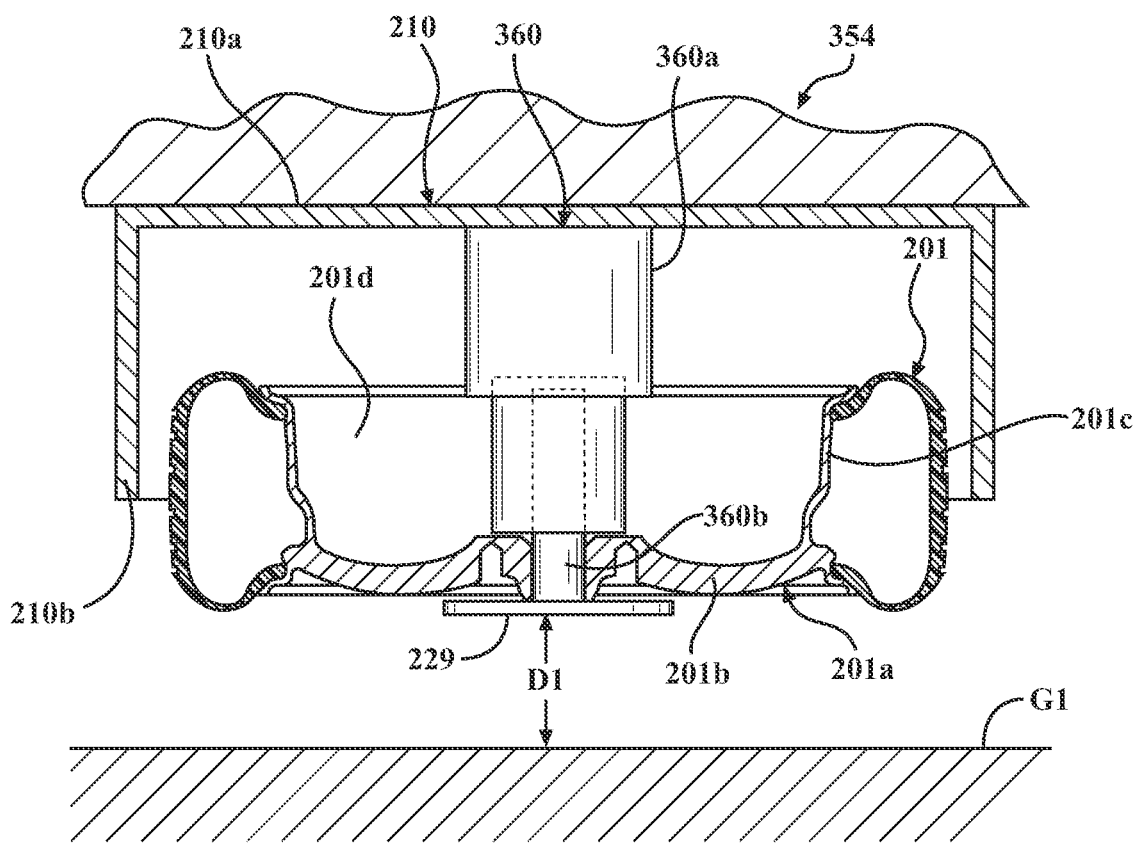
FIG. 4B is the schematic cross-sectional view of FIG. 4A, showing the third embodiment of the lifting system in a deployed condition enabling detachment of the stored vehicle wheel from the lifting system for use as a spare tire.
Figure 4C:
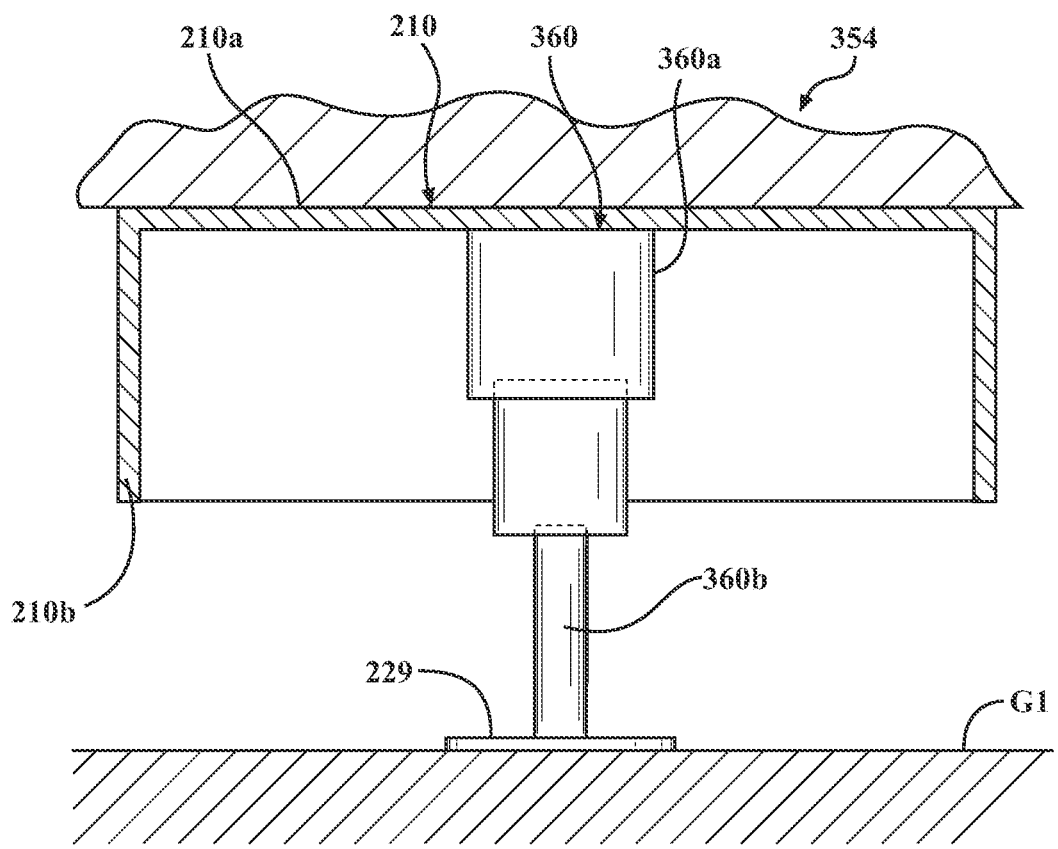
FIG. 4C is the schematic cross-sectional view of FIGS. 4A and 4B, showing the third embodiment of the lifting system after removal of the vehicle wheel and in a fully deployed condition in contact with a ground surface for exerting a lifting force on the vehicle.

FIGS. 4A-4C show another particular embodiment 354 of the lifting system including an associated particular embodiment of the force-generating system. Referring to FIGS. 4A-4C, in one or more arrangements, the force-generating system may be in the form of a commercially available hydraulic or pneumatic cylinder or ram 360. The force-generating mechanism 360 may include and/or be operably connected to any elements (such as control valving, one or more accumulators and/or any other component(s) and/or system(s)) necessary for controlling operation of the cylinder 360 in a manner described herein, given the particular configuration of the force-generating mechanism. The force-generating mechanism 360 may be operably connected to vehicle components/systems that are also used for other purposes (for example, an accumulator or reservoir for pressurizing working fluid for an adaptive suspension system). As seen in FIGS. 4A-4C, the cylinder 360 may be structured for telescoping operation, to be extendible to move a bearing member 229 (and, optionally, a connected vehicle wheel 201) in a direction toward the ground surface G1. For a stowed condition of the lifting system (FIG. 4A), the cylinder 360 may be retractable so as to fit inside the rim cavity 201d as shown in FIG. 4A.

As shown in FIGS. 4A-4C, the first portion of the force-generating mechanism may be a base 360a of the ram which may be operably connected to the vehicle frame or to a housing 210 as described herein. The second portion of the force-generating mechanism may be an extendible shaft 360b of the cylinder, which may be structured for operable connection to the bearing member 229. The cylinder 360 may be controlled to extend the shaft from the stowed condition (FIG. 4A) to bring the bearing member 229 toward and in contact with the ground surface G1 (FIG. 4C).

As described herein, and as shown in FIG. 4B, responsive to a wheel access control command, the force-generating mechanism of the lifting system 354 may be controlled to move the vehicle wheel 201 toward the ground surface G1 to a location a predetermined distance D1 from the ground surface. This function may act to lower the vehicle wheel 201 from the housing to a vehicle wheel removal location so that a user may remove it for use as a spare tire.

The bearing member 229 may be operably connected to an associated force-generating mechanism and structured to transmit a force generated by the force-generating mechanism to a surface in physical contact with the bearing member. The bearing member 229 may also be structured for operably connecting the wheel 201 to the force-generating mechanism.

In one or more arrangements, and as shown in FIGS. 2A-4C, the bearing member 229 may be connected to the force-generating mechanism along an exterior of the rim cavity 201d. In such arrangements, the bearing member 229 may operably connect the wheel 201 to the respective force-generating mechanism by mounting the wheel on the second portion of the force-generating mechanism and then attaching the bearing member to the second portion of the force-generating mechanism to secure the wheel to the force-generating mechanism. For example, as shown in FIGS. 2A-4C, the wheel rim 201a may be mounted to the second portion of the respective force-generating mechanism, then the bearing member 229 may be bolted or otherwise removably attached to the second portion of the force-generating mechanism to secure the bearing member to the force-generating mechanism. In particular arrangements, as seen in FIGS. 2A-4C, the second portion of the lifting mechanism may extend partially or completely through the wheel rim to enable attachment of the bearing member to the portion of the lifting mechanism.

As shown in FIGS. 2A-4C, in one or more arrangements, the surface in physical contact with the bearing member 229 may be a ground surface G1 on which the vehicle resides. The ground surface G1 may be a paved road surface or another paved surface, or the ground surface may be an unpaved-surface. The ground surface may also be partially-paved and partially unpaved. The arrangement of the bearing member shown in FIGS. 2A-4C may be used to lift or separate a portion of the vehicle from the ground surface for purposes of (for example) changing a flat tire. This may be done responsive to generation of a lifting control command by a user (i.e., a command intended to lift a portion of the vehicle from the ground surface). The arrangement of the bearing member shown in FIGS. 2A-4C may also be used to implement a parking brake function as described in greater detail below (i.e., the bearing member 229 may be moved toward and into contact with the ground surface G1 until a predetermined level of bearing force is sensed).

Figure 5:
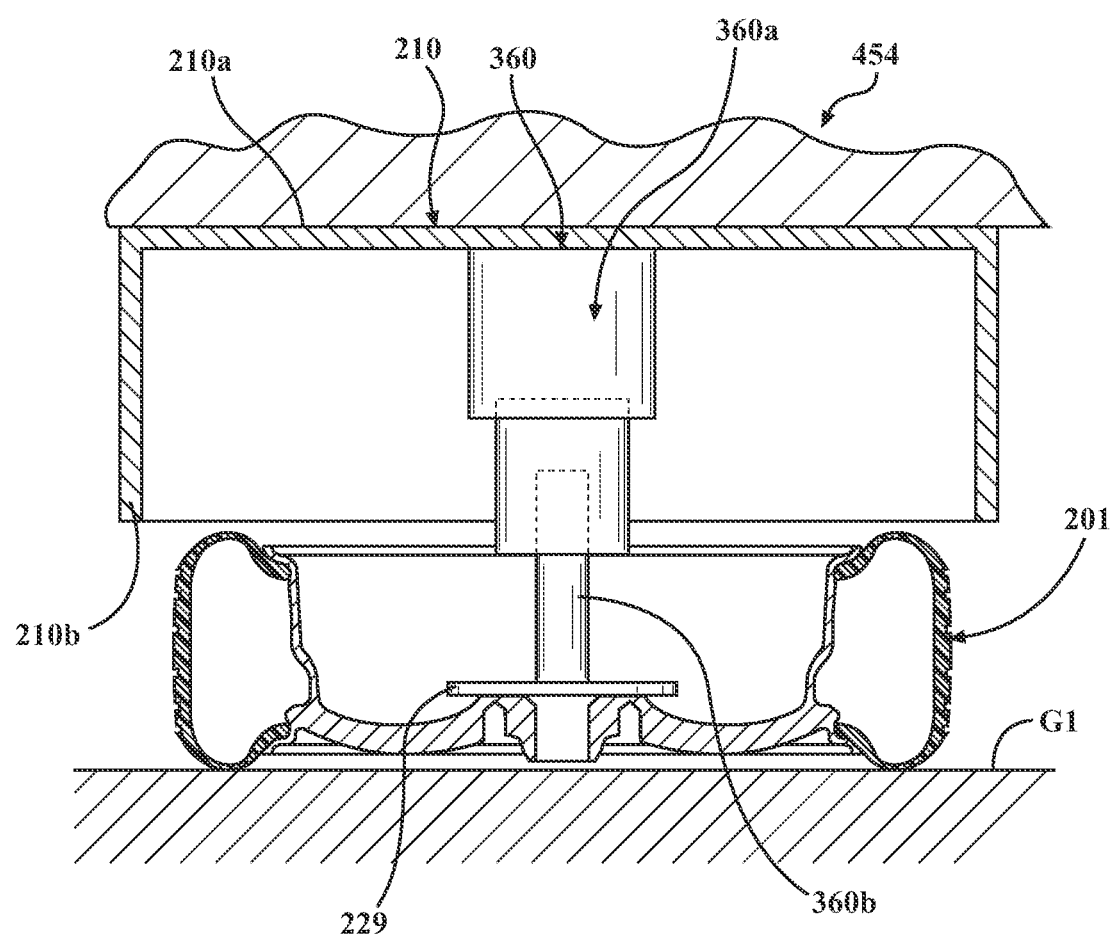
FIG. 5 is a schematic cross-sectional view of a portion of a vehicle, showing a fourth embodiment of the lifting system operably connected to a frame of the vehicle and in a fully deployed condition in contact with a ground surface for exerting a lifting force on the vehicle.

FIG. 5 shows an alternative arrangement of the lifting system which may be incorporated into alternative versions of any of the lifting system embodiments shown in FIGS. 2A-4C. The particular embodiment shown in FIG. 5 uses the force-generating mechanism shown in FIGS. 4A-4C; however, another suitable force generating mechanism may be used. As shown in FIG. 5, in one or more particular arrangements, the surface in physical contact with the bearing member 229 may be a surface of the wheel rim 201a. In such embodiments, the bearing member 229 may be connected to the force-generating mechanism inside the rim cavity 201d. Also, the force-generating mechanism may be structured to push the bearing member 229 against the rim 201a to force the wheel 201 into contact with the ground surface G1 during operation of the force-generating mechanism. This may be done in response to generation of a parking brake control command by a user (i.e., a command initiating a parking brake function designed to exert a predetermined bearing force on the ground surface without lifting the vehicle from the ground surface).

In one or more arrangements, and as seen in FIG. 5, the bearing member 229 may attach the wheel 201 to the force-generating mechanism by operably connecting the bearing member 229 to the second portion of the force-generating mechanism and then operably connecting the wheel 201 to the bearing member. For example, the wheel rim 201a may be removably bolted to the bearing member 229 after the bearing member is connected to the second portion 360b of the force-generating mechanism. Pressing the vehicle wheel 201 (including the rubber of the tire 203) against the ground surface G1 to implement a parking brake function may provide a relatively high-surface area bearing surface which aids in preventing undesired motion of the vehicle 100.

Referring again to FIG. 1, the processor(s) 144 may be any components configured to execute any of the processes described herein or any form of instructions to carry out such processes or cause such processes to be performed. The processor(s) 144 may be implemented with one or more general-purpose or special-purpose processors. Examples of suitable processor(s) 144 include microprocessors, microcontrollers, digital signal processors or other forms of circuity that execute software. Other examples of suitable processor(s) 144 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processor(s) 144 may include at least one hardware circuit (e.g., an integrated circuit) configured to carry out instructions contained in program code. In arrangements where there are multiple processors 144, the processors 144 may work independently from each other or in combination with one another.

The memory 146 is a non-transitory computer readable medium. The memory 146 may include volatile or nonvolatile memory, or both. Examples of suitable memory 146 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 146 includes stored instructions in program code. Such instructions are executable by the processors 144 or the control module 323. The memory 146 may be part of the processors 144 or the control module 323, or may be communicatively connected the processors 144 or the control module 323.

Generally speaking, the control module 323 includes instructions that may be executed by the processor(s) 144. The control module 323 may be implemented as computer readable program code that, when executed by the processor(s) 144, execute one or more of the processes described herein. Such computer readable program code may be stored on the memory 146. The control module 323 may be part of the processors 144, or may be communicatively connected the processor(s) 144. Generally, a "module" as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

FIGS. 2A, 3A, and 4A show the lifting systems 154, 254, and 354 in stowed conditions of the respective embodiments. When a lifting system is not in a stowed condition, it is in a deployed condition further to the performance of one of the functions described herein.

For implementation of a parking brake function, the control module 323 may include instructions that when executed by the processor(s) 144 cause the processor(s) to, responsive to a parking brake control command, control operation of a respective force-generating mechanism to lower the bearing member 229 toward the ground surface G1 on which the vehicle resides until a predetermined level of bearing force is applied to the surface. The bearing force may be measured by the force sensor 369 and operation of the force-generating mechanism to lower the bearing member 229 may be halted when the predetermined level of bearing force is reached. The predetermined level of bearing force for parking brake purposes may be insufficient to physically raise a portion of the vehicle 100 off of the ground surface G1, while still being sufficient to impede movement (especially unpowered movement) of the vehicle. This may aid in preventing damage to the vehicle wheel 201 which may result from attempting to physically lift or separate a portion of the vehicle 100 from the ground surface G1.

For implementation of a lifting function on a portion of the vehicle 100, the control module 323 may include instructions that when executed by the processor(s) 144 cause the processor(s) to, responsive to a lifting control command, control operation of the force-generating mechanism to move the bearing member 229 into contact with the ground surface G1 and generate a force sufficient to lift the portion of the vehicle a predetermined distance from the ground surface.

The control module 323 may also include instructions that when executed by the processor(s) 144 cause the processor(s) to, responsive to a vehicle wheel access control command, control the force-generating mechanism to move the vehicle wheel 201 toward the ground surface G1 to a location a predetermined distance D1 from the ground surface. This function may act to lower the vehicle wheel 201 from the housing to a vehicle wheel removal location so that a user may remove it for use as a spare tire. For example, FIG. 2C shows the wheel 201 moved from a stowed location (FIG. 2A) to a vehicle wheel removal location (FIG. 2C). FIG. 3B shows the wheel 201 moved from a stowed location (FIG. 3A) to a vehicle wheel removal location (FIG. 3B). FIG. 4B shows the wheel 201 moved from a stowed location (FIG. 4A) to a vehicle wheel removal location (FIG. 4B).

The control module 323 may also include instructions that when executed by the processor(s) 144 cause the processor(s) to, responsive to the lifting control command, and prior to controlling the force-generating mechanism to move the vehicle wheel 201 toward the ground surface, control operation of the vehicle transmission 383 to shift the transmission to a parking mode. This function may shift and lock the vehicle transmission 383 in a "parking" mode prior to lifting of the vehicle 100, to prevent any driven wheels of wheels 109 or 111 remaining on the ground G1 from rotating while a portion of the vehicle is lifted and also while the portion of the vehicle is elevated. In vehicles which do not use a conventional transmission (for example, electric vehicles), the control module 323 may be configured to control operation of the electric motor and/or vehicle drive mechanism (depending on the particular vehicle design) so as to prevent or inhibit rotation of any driven wheels prior to lifting of a portion of the vehicle off the ground surface, and also while the portion of the vehicle is elevated off the ground surface.

Figure 6:
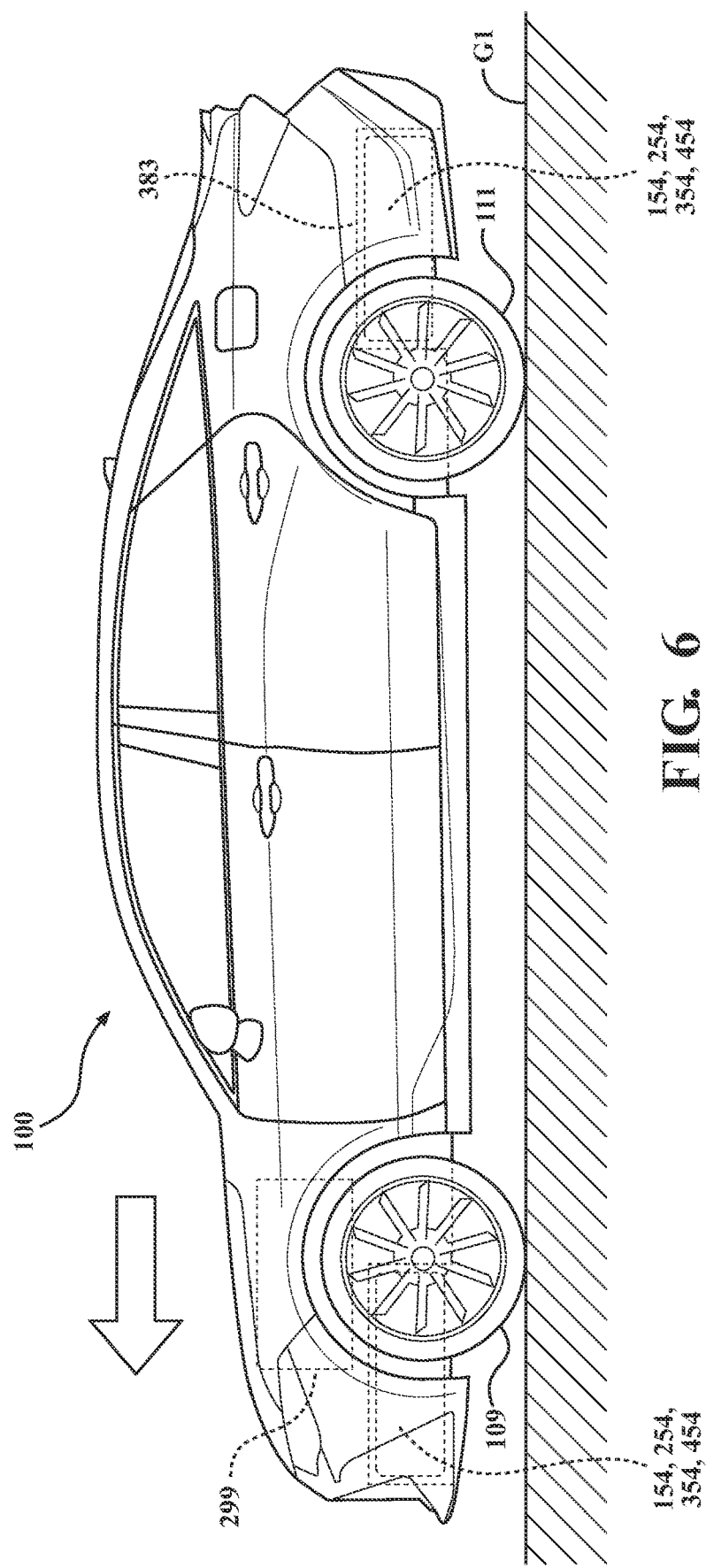
FIG. 6 is a schematic exterior view of a vehicle showing possible mounting locations for embodiments of the lifting system.

Referring now to FIG. 6, in one or more arrangements, the housing 210, force generating mechanism, and bearing member 229 may be mounted to the frame 199 at a location below or adjacent a portion of an engine 299 of the vehicle 100. In one or more arrangements, the housing, force generating mechanism, and bearing member may be mounted to the frame at a location below or adjacent a portion of the transmission 383 of the vehicle 100. Minimizing the distances between the locations of application of lifting forces to the frame 199 and the centers of gravity of the engine 299 and transmission 383 (or the centers of gravity of any other relatively high-mass vehicle power and/or drive components in alternative vehicle designs) may aid in minimizing force moments which may unduly stress the frame.

If the lifting system is mounted near an end of the vehicle 100 and along or near a fore-aft axis centerline of the vehicle, the lifting system may be used to lift an entire associated end of the vehicle.

In addition to providing a location for storing a spare tire, positioning of the wheel 201 as shown in the embodiments described herein may help protect elements of the lifting system from the vehicle environment.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

Flowcharts and block diagrams (if any) included in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for generating a lifting force on a portion of a vehicle, the system comprising:
   a vehicle wheel;
   a force-generating mechanism structured to be operably connected to a frame of a vehicle; and
   a bearing member operably connected to the force-generating mechanism and structured to transmit a force generated by the force-generating mechanism to a surface in physical contact with the bearing member, the bearing member also being structured for operably connecting the wheel to the force-generating mechanism,
   the system being structured so that the bearing member is enabled to physically contact a ground surface when the system is mounted on a vehicle and the wheel is connected to the force generating mechanism along a first side of the bearing member.

2. The system of claim 1 further comprising
   a processor; and
   a memory communicably coupled to the processor and storing a control module including instructions that when executed by the processor cause the processor to, responsive to a parking brake control command, control operation of the force-generating mechanism to lower the bearing member toward a ground surface on which the vehicle resides until a predetermined level of bearing force is applied to the surface.

3. The system of claim 1 further comprising
   a processor; and
   a memory communicably coupled to the processor and storing a control module including instructions that when executed by the processor cause the processor to, responsive to a lifting control command, control operation of the force-generating mechanism to move the bearing member into contact with a ground surface and generate a force sufficient to lift the portion of the vehicle to a location spaced apart from the ground surface.

4. The system of claim 3 including instructions that when executed by the processor cause the processor to, responsive to the lifting control command, and prior to controlling the force-generating mechanism to move the vehicle wheel toward the ground surface, control operation of a vehicle transmission to shift the transmission to a parking mode.

5. The system of claim 1 further comprising:
   a processor; and
   a memory communicably coupled to the processor and storing a control module including instructions that when executed by the processor cause the processor to, responsive to a wheel access control command, control the force-generating mechanism to move the vehicle wheel toward a ground surface to a location spaced apart from the ground surface.

6. The system of claim 1 further comprising a housing structured for attachment to the frame and structured to receive the wheel therein, the housing defining an opening structured to receive the vehicle wheel therein and to face in a direction toward the ground surface when the housing is attached to the frame.

7. The system of claim 1 wherein the vehicle wheel has a rim defining a rim cavity, and wherein the bearing member is connected to the force-generating mechanism inside the rim cavity.

8. The system of claim 7 wherein the force-generating mechanism is structured to push the bearing member against the rim to force the wheel into contact with a ground surface during operation of the force-generating mechanism.

9. The system of claim 1 wherein the bearing member is connected to the force-generating mechanism along an exterior of the rim cavity.

10. The system of claim 1, structured so that the bearing member is prevented from physically contacting a ground surface when the wheel is connected to the force generating mechanism along a second side of the bearing member opposite the first side.

* * * * *